United States Patent
Andersson

(10) Patent No.: US 9,643,344 B2
(45) Date of Patent: May 9, 2017

(54) UV CURING METHOD AND AN ASSEMBLY THEREFOR

(75) Inventor: Thomas Andersson, Kungsör (SE)

(73) Assignee: Kungsörs Plast AB, Kungsör (SE)

( * ) Notice: Subject to any disclaimer, the term of this patent is extended or adjusted under 35 U.S.C. 154(b) by 1034 days.

(21) Appl. No.: 13/701,611

(22) PCT Filed: Jun. 8, 2011

(86) PCT No.: PCT/SE2011/050708
§ 371 (c)(1),
(2), (4) Date: Dec. 27, 2012

(87) PCT Pub. No.: WO2011/155896
PCT Pub. Date: Dec. 15, 2011

(65) Prior Publication Data
US 2013/0093124 A1    Apr. 18, 2013

(30) Foreign Application Priority Data

Jun. 8, 2010  (SE) ........................................ 1050586
Jun. 8, 2010  (SE) ........................................ 1050587

(51) Int. Cl.
*B29C 35/08* (2006.01)
*B29C 33/40* (2006.01)
(Continued)

(52) U.S. Cl.
CPC .......... *B29C 35/0805* (2013.01); *B29C 33/40* (2013.01); *B29C 35/0888* (2013.01);
(Continued)

(58) Field of Classification Search
CPC .. B29C 35/0805; B29C 33/40; B29C 35/0888
See application file for complete search history.

(56) References Cited

U.S. PATENT DOCUMENTS 4,166,088 A * 8/1979 Neefe .................... B29C 33/40
264/1.38
5,885,514 A  3/1999 Tensor
(Continued)

FOREIGN PATENT DOCUMENTS

EP    0686486 A2    12/1995
EP    1484148 A1    12/2004
(Continued)

OTHER PUBLICATIONS

International Search Report Corresponding to International Application No. PCT/SE2011/050708; Date of Mailing: Sep. 29, 2011; 7 Pages.

(Continued)

*Primary Examiner* — Joseph S. Del Sole
*Assistant Examiner* — John Robitaille
(74) *Attorney, Agent, or Firm* — Myers Bigel, P.A.

(57) ABSTRACT

It is presented a method for producing a cured polymer structure from a polymer compound which is UV curable and partly UV transparent. The method comprises injecting the polymer compound into a mold (2), which mold (2) has at least one wall (7) defining a mold space (6) for receiving the polymer compound in the mold space (6). The at least one wall (7) of the mold (2) is UV transparent and comprises a thermoplastic polymer. The polymer compound is then irradiated through the at least one wall (7), by means of at least one UV semiconductor light source, thereby curing the polymer compound to form the cured polymer structure. An assembly for producing a polymer structure and a mold (2) is also presented herein.

12 Claims, 4 Drawing Sheets

(51) Int. Cl.
  *B29C 45/00* (2006.01)
  *B29K 83/00* (2006.01)
(52) U.S. Cl.
  CPC .. *B29C 45/0053* (2013.01); *B29C 2035/0827* (2013.01); *B29C 2045/0075* (2013.01); *B29K 2083/005* (2013.01); *B29K 2827/06* (2013.01); *B29K 2867/003* (2013.01)

(56) References Cited

U.S. PATENT DOCUMENTS

| | | | |
|---|---|---|---|
| 2002/0113334 A1 | 8/2002 | Matsuoka et al. | |
| 2005/0158003 A1* | 7/2005 | Ohtsu | B29C 39/24 385/129 |
| 2006/0255512 A1 | 11/2006 | Joyner | |
| 2008/0128955 A1 | 6/2008 | Lim et al. | |
| 2009/0256287 A1* | 10/2009 | Fu | B82Y 10/00 264/447 |
| 2009/0267269 A1 | 10/2009 | Lim et al. | |
| 2010/0041169 A1* | 2/2010 | Lee | B29C 35/0888 438/26 |

FOREIGN PATENT DOCUMENTS

| | | |
|---|---|---|
| EP | 2033778 A1 | 3/2009 |
| JP | 2007-152627 A | 6/2007 |
| WO | WO 03/004255 A2 | 1/2003 |

OTHER PUBLICATIONS

International Preliminary Report on Patentability Corresponding to International Application No. PCT/SE2011/050708 ; Date of Completion: May 3, 2012; 5 Pages.

\* cited by examiner

UV CURING METHOD AND AN ASSEMBLY THEREFOR

RELATED APPLICATIONS

This application is a 35 U.S.C. §371 national phase application of PCT Application PCT/SE2011/050708 filed Jun. 8, 2011 which claims priority to SE 1050587-3 filed Jun. 8, 2010 and SE 1050586-5 filed Jun. 8, 2010. The entire content of each of these applications is incorporated herein by reference.

FIELD OF THE INVENTION

The invention generally relates to curing of polymers, and in particular to the curing of polymers in a mould by means of UV light.

BACKGROUND

Curing involves hardening of polymer structures by cross-linking polymer chains. Such cured polymer structures have a multitude of applications; they may for instance be utilised in high voltage applications.

The curing process of a polymer composite which is to be formed into a polymer structure traditionally involves injecting the polymer composite into a mould, wherein the mould is heated, thereby shaping the polymer structure from the polymer composite and curing the same. The mould is typically made of steel or a similar material having good thermally conductive properties.

Drawbacks with this curing process are that it is both costly and time-consuming. The moulds in which the polymer structures are moulded and cured are very expensive. Hence each mould is a considerable investment for manufacturers of cured polymer structures. For small production volumes, the cost of the finished polymer structure product is thereby reflected in the mould expenses.

Further, since each mould is very expensive, a manufacturer may not be able to invest in a set of differently sized or shaped moulds, which would provide more flexibility in producing different size polymer structures for different applications, due to the high costs involved. Moreover, the decision of purchasing a new mould requires careful planning for the manufacturer, because a new mould normally takes several months to develop.

Additionally, the mould assembly is subject to high pressures due to the temperature rise during the curing process, putting the mould under constant stress. Thermal expansion of the mould during moulding and curing further increases the costs of the mould assembly, as thermal expansion parameters must be taken into consideration upon construction of the mould assembly.

By utilizing ultra violet (UV) light for curing polymer composites, some of the above drawbacks can be mitigated. As an example, U.S. Pat. No. 5,885,514 discloses an ambient UVL-curable elastomer mould apparatus. The apparatus utilizes injection moulding by injecting an elastomer between two UV-transparent mould plates forming a mould cavity, wherein the mould is irradiated with UV light in order to cure the elastomer in the mould cavity.

However, some of the above problems remain even for production methods involving curing of polymers by means of UV light.

SUMMARY

An object of the present invention is to provide a curing method and an assembly to overcome or at least mitigate the drawbacks described above.

Another object is to provide a simplified and more efficient curing process and an assembly therefor.

Yet another object of the present invention is to provide a fast and reliable curing process.

Accordingly, in a first aspect of the present invention there is provided a method of producing a cured polymer structure from a polymer compound, which polymer compound is UV curable and partly UV transparent, wherein the method comprises:

injecting the polymer compound into a mould, which mould has at least one wall defining a mould space for receiving the polymer compound in the mould space, wherein the at least one wall is UV transparent and comprises a thermoplastic polymer, and irradiating the polymer compound, through the at least one wall, by means of UV light provided by at least one UV semiconductor light source, wherein the irradiating comprises irradiating the at least one wall such that UV light passes through the polymer compound, thereby curing the polymer compound to form the cured polymer structure.

Partial UV transparency is herein to be understood as the polymer compound being homogenously UV transparent. To this end each portion of the polymer compound is substantially equally UV transparent. Hence, some absorption of UV light propagating through the polymer compound may occur in any portion of the polymer compound.

By a mould space is generally meant an enclosing space. Such a mould space may be formed by one or several walls of the mould.

An effect which may be obtainable by means of the present invention is that the curing process in the mould may be shortened. Compared to previous UV curing methods utilizing traditional UV light sources such as halogen lamps, the emission spectrum of a UV semiconductor light source such as a UV LED can be much more precisely defined. By providing a UV light source with a well-defined spectrum i.e. by means of one or more semiconductor light sources, the curing becomes more efficient and better control of the curing process can be obtained. Furthermore, UV semiconductor light sources have a lower power consumption compared to traditional light sources, and the radiated heat is less than the radiated heat from traditional light sources such as halogen lamps. Therefore, the quality requirements of the mould can be reduced with regards to thermal sensitivity, mould wall thickness and the like, thereby resulting in lower mould costs.

In one embodiment, the at least one wall comprises a thermoplastic polymer, and the at least one wall is so thin that the at least one wall is flexible.

An effect which may be obtainable by providing walls that are so thin that they are flexible, is that that the UV curing may be optimised in the sense that due to its thinness the at least one wall will absorb a minimal amount of UV radiation. Beneficially, the effective curing time may hence be shortened. Further, less material may be needed to construct the mould, and the cost and time for developing a mould with a different size and/or shape may be shortened. Moreover, because the wall thickness is so thin that the at least one wall defining the mould space becomes flexible, the mould may expand at thermal expansion of the polymer compound. Further, the UV transparency of the polymer compound and hence the mould product, i.e. the polymer structure, is typically also transparent for light in the visible spectrum, making it easy to inspect whether there are air pockets in the polymer structure. Air pockets in polymer structures for e.g. high voltage applications are generally not desirable, because electrical breakdown between the inner surfaces of the air pocket may occur, gradually breaking down the polymer structure and hence decreasing the lifetime of the polymer structure.

Additionally, there is no scorch time involved in the curing process, since the curing is obtained by means of UV light, and hence the polymer compound does not have to contain temperature dependent catalyst. Hereto, the curing is performed when the mould is irradiated with UV light. The mould may comprise Polyvinyl chloride (PVC). A PVC mould has excellent de-moulding properties with negligible adhesion to cured liquid silicone rubber (LSR) compounds and no inhibiting tendencies with regards to the UV activated catalyst used. Alternatively, the mould may comprise Polyethylene terephthalate (PET). PVC and PET moulds are UV transparent and are easy to produce, e.g. by vacuum forming the mould parts.

The at least one wall may have a thickness less than 1 mm. A thickness that is less than 1 mm is typically enough to provide a mould that is durable for at least one mould cycle. A mould cycle is herein defined as the moulding and curing process of one polymer structure.

The mould may allow for a curing process having disposable moulds, i.e. the mould may be used for one or more mould cycle prior to discarding the mould. This may be beneficial in applications when contamination-free moulds are required, such as when moulding polymer structures for medical applications.

The irradiating may comprise irradiating the polymer compound from several directions simultaneously. Thereby, the curing time may be further shortened, and uniform curing of the polymer compound may be achieved.

The irradiating may comprise irradiating with UV light having wavelengths in the range 290-400 nm. By irradiating the polymer compound in this wavelength range, the curing has been shown to be particularly efficient.

The irradiating may comprise irradiating with UV light having a wavelength of 365 nm. For this wavelength, the heat generated in the mould and the heat affecting the mould has been shown to be very low, in practice almost completely negligible.

The polymer compound may comprise liquid silicone rubber (LSR). LSR has inherent properties that are particularly suitable for UV curing and for use in high voltage applications because of its UV transparency, insulation properties, and UV stability in the sense that LSR is not affected negatively by the UV radiation.

Preferably, the method may comprise mixing a UV-activated catalyst with at least a portion of the polymer compound. Thereby, curing by UV light may be activated in the polymer compound. Preferably, the UV-activated additive is mixed with the at least one portion of the polymer compound prior to injecting the polymer compound into the mould space of the mould.

The irradiating may comprise irradiating the polymer compound for a time in the range 10-60 seconds, preferably in the range 15-25 seconds. The irradiating time needed for curing the polymer compound typically depends on the intensity of the irradiating UV light source.

The irradiating may comprise circumferential irradiation of an external peripheral surface of the at least one wall. The external peripheral surface is external with respect to the mould space inner surface, which inner surface may be in contact with an injected polymer compound. Hence, the envelope surface of the mould may be irradiated and the irradiating light may be transmitted through the mould. Thereby, all portions of the polymer compound may be irradiated with UV light in a manner that the light intensity is still sufficiently high for curing all portions of the polymer compound. This may be beneficial for curing large structures, such as insulators for high voltage applications.

The mould may be a blister pack. Blister packs are easily produced by vacuum forming. A blister pack is to be construed as a polymer mould being comprised of at least one flexible moulded part having a convexity for receiving a polymer compound therein. Two such moulded parts with corresponding convexities may e.g. be clamped together, whereby the mould space is formed by the corresponding convexities.

In a second aspect of the present invention there is provided an assembly for producing a cured polymer structure from a polymer compound, which polymer compound is UV curable and partly UV transparent, the curing assembly comprising:
- a mould having at least one wall defining a mould space for receiving the polymer compound in the mould space, wherein the at least one wall is UV transparent and comprises a thermoplastic polymer,
- injecting means arranged to inject the polymer compound into the mould, and
- at least one UV semiconductor light source arranged to irradiate the injected polymer compound through the at least one wall of the mould.

In one embodiment, the at least one wall may be so thin that the at least one wall is flexible.

In a third aspect of the present invention there is provided a mould for moulding polymer compounds, which mould has at least one wall defining a mould space for receiving the polymer compound in the mould space, which at least one wall comprises a thermoplastic polymer and is UV transparent, wherein the at least one wall is so thin that the at least one wall is flexible.

It is to be noted that the present disclosure according to the different aspects presented herein is not for moulding contact lenses. Indeed the present disclosure provides methods and assemblies for moulding larger objects than contact lenses. In particular, the moulding methods and assemblies are intended for industrial use, e.g. for the production of medical containers and insulation structures for high voltage applications for use in power systems. Additional examples of polymer structures which can be produced by the methods and assemblies presented herein are:
- suction cups, especially bellow types; anti-vibration mounts of substantial material thickness comprising insert details in particular plastics or made of other heat sensitive substances;
- Bushings used e.g. for automotive applications, in particular comprising outer and inner sleeves, to avoid internal stresses inevitably formed upon cooling from elevated mould temperature if conventional heat cured compounds and moulding techniques are used;
- Fasteners, in general comprising metal replacement structures and at the same time making it possible to deliver the detail/s using the blister mould as package comprising identification like bar codes, RFIDs or other to allow for automated identification, registration of items manufactured, number in stock, sales statistics etc;
- Sheeting: To cost efficiently manufacture moulded sheets in a variety of sizes and shapes in UV-LSR for protective and/or decorative coverage of structures and surfaces providing e.g. enhanced friction, electrical, thermal and/or vibration insulation;
- Allows for overmoulding of sensitive components including UV-resistant electronics like RFIDs.

In more general, polymer structures which are suitable to be produced according to the present disclosure are rotational shaped products, including variants with large undercut only possibility to de-mould by breaking the mould, or part thereof.

Another general field of application is metal replacements made of thermosetting materials such as unsaturated polyester, epoxy materials and similar UV-transparent material compounds with or without glass reinforcements using, intermixed, UV-initiators replacing, or as supplement to, the conventional systems used for curing.

Further features and advantages of the present invention will be evident from the following description.

BRIEF DESCRIPTION OF THE DRAWINGS

The invention and further advantages thereof will now be described by non-limiting examples of embodiments with reference to the accompanying drawings.

DETAILED DESCRIPTION

In the following description, for purpose of explanation and not limitation, specific details are set forth, such as particular techniques and applications in order to provide a thorough understanding of the present invention. However, it will be apparent for a person skilled in the art that the present invention may be practiced in other embodiments that depart from these specific details, within the scope of the appended claims. In other instances, detailed description of well-known methods and apparatuses are omitted so as not to obscure the description with unnecessary details.

The present inventor has realised that when utilising semiconductor light sources for curing polymer compounds, there will be less requirements in regards of heat resistance in the mould construction because less heat is generated by semiconductor light sources.

Figure 1:
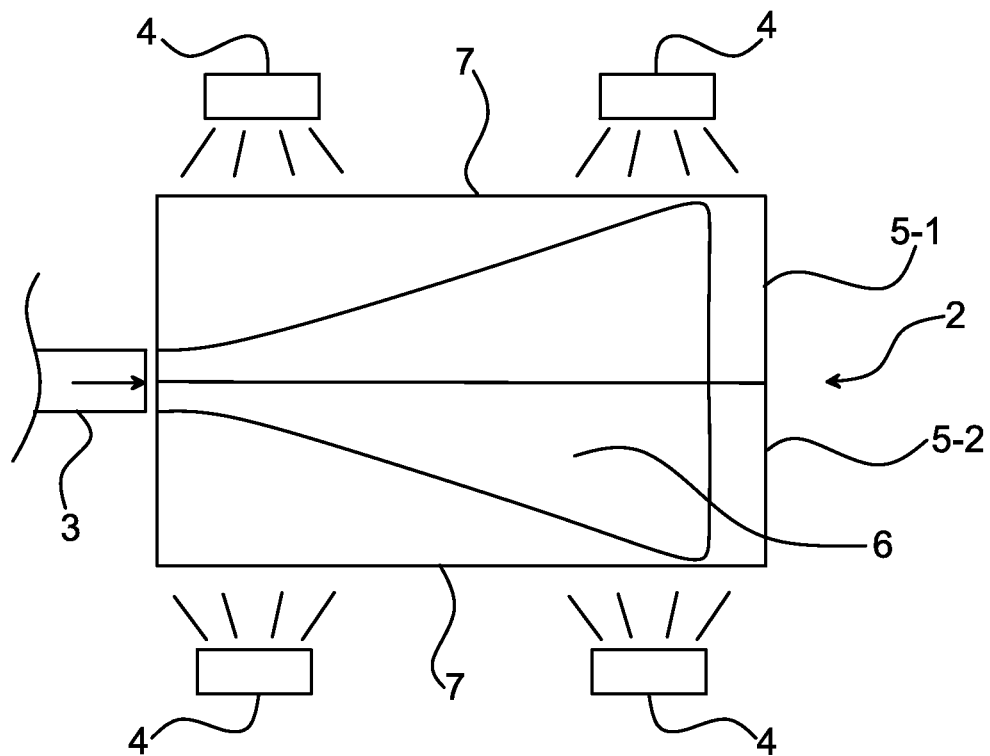
FIG. 1 shows a schematic view of an example of an assembly for producing a cured polymer structure according to the present invention.

With reference to FIG. 1, an example of an assembly 1 for producing a cured polymer structure is shown. The assembly 1 comprises a mould 2, an injecting means 3, and a plurality of UV light sources 4. The injecting means 3 is arranged to inject a polymer compound (not shown) into the mould 2. The injecting means 3 may for instance be a nozzle which, by applying pressure thereto, may inject the polymer compound into the mould 2.

The mould 2 comprises walls 7, which define a mould space 6. The mould space 6 may receive the polymer compound injected into the mould 2. The mould space 6 typically circumferentially encloses an injected polymer compound.

The presently exemplified mould 2 comprises two mould-halves 5-1 and 5-2, which when brought together defines the mould space 6. The walls 7 are UV transparent so as to allow transmission of UV light through the walls 7 to cure the polymer compound in the mould space 6.

Other mould shapes are also possible within the scope of the present invention. Such moulds may for instance comprise a single mould part with one wall forming a mould space. Such single mould shapes may for instance be conical or hemispherical shaped. The open bottom surface of such a mould is typically filled with a structure which is to be included in the mould product, i.e. the polymer structure.

Alternatively, a mould may comprise a plurality of moulds parts together forming a mould space when the plurality of mould parts are assembled with each other to form the mould. Typically, the walls of the mould forming the mould space enclose the injected polymer compound.

In one embodiment, the mould may have a non-constant cross-section along its longitudinal axis. In another embodiment, the mould may have a constant cross-section along its longitudinal axis.

The assembly 1 may be housed in a UV protective housing (not shown) so as to filter harmful UV radiation from the surroundings.

After encouraging initial laboratory results, moulds have been developed having very thin wall thicknesses with little material consumption making disposable moulds a cost-effective alternative to costly sustainable moulds. In addition, the thin wall thickness allows that UV-light may pass through the walls with a minimum of energy loss, thereby optimizing the UV curing performance.

Hereto, in one embodiment the at least one wall of the mould is so thin that it is flexible. Such a mould may be of blister pack-type.

Figure 2:
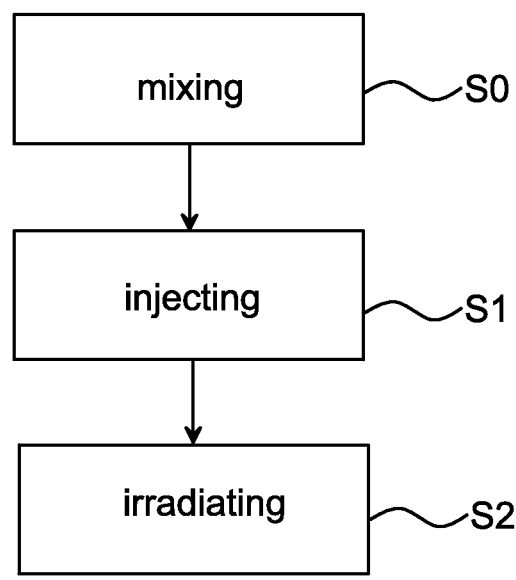
FIG. 2 shows a flow chart of a process for producing a cured polymer structure.

With reference to FIG. 2, a flow chart of a method for producing a cured polymer structure is shown. In particular, a method for producing the cured polymer structure from a polymer compound which is UV curable and partly UV transparent, preferably 60-70% UV transparent and even more preferably 80-90% UV transparent, will be described in the following.

The polymer compound will hereinafter be exemplified by liquid silicone rubber. However, other polymer compounds, such as epoxy or other thermosetting polymers may also be used.

In a step S0, a catalyst is mixed with at least one portion of the liquid silicone rubber. Typically, the liquid silicone rubber comprises a component A and a component B, which components A and B are mixed. Normally either component A or component B comprises the catalyst. However, in one embodiment, the catalyst may be contained in both components A and B prior to mixing of components A and B.

The catalyst is a UV-activated catalyst, which catalyst actives the curing process in the liquid silicone rubber when the liquid silicone rubber is irradiated with UV light. The catalyst may for instance be a platinum catalyst. The components A and B are mixed with so as to allow uniform curing of the liquid silicone rubber.

Typically, care should be taken when adding the catalyst so that the liquid silicone rubber is exposed to a minimum of light containing UV components prior to injecting the liquid silicone rubber into a mould. Such exposure may result in premature curing of the liquid silicone rubber, i.e. curing before forming the liquid silicone rubber in the mould.

In a step S1, the liquid silicone rubber is injected into the mould 2. The liquid silicone rubber may be injected by injecting means 3 into the mould 2. The injecting means 3 may by any suitable means for injecting a liquid polymer into a mould, e.g. a nozzle or a tube, as would be apparent to the skilled person in the art.

The mould 2 may be manufactured from a UV transparent thermoplastic polymer. The mould 2 may for instance be manufactured from Polyvinyl chloride (PVC), Polyethylene terephthalate (PET) or cured silicone rubber. The construction of the mould 2 is preferably performed by vacuum moulding or blow moulding. The walls 7 defining the mould space are preferably thin so as to allow the walls 7 to be flexible. The walls 7 may for instance have a thickness less than 1 mm. Preferably, the mould 2 is of blister pack-type.

An assembled mould has an opening being connected with the mould space, so as to allow injection of the liquid silicone rubber into the mould.

If the mould comprises several mould parts, such as in the above example, the mould parts are typically clamped together prior to the liquid silicone rubber being injected into the mould.

In one embodiment, the walls uniformly have the same thickness in order to ensure that the same amount of radiation may penetrate the walls for irradiating the liquid silicone rubber enclosed in the mould space.

In a step S2, the liquid silicone rubber is irradiated by UV light through the mould 2. The irradiating light source may typically be one or a plurality of UV emitting semiconductor light sources. Such light sources typically have a narrow emission bandwidth matched to the UV catalyst activation energy. Preferably all of the emitted light from the UV emitting semiconductor light source(s) is in the UV spectrum.

Industrial semiconductor UV lighting devices can be utilized in the irradiating process. For instance industrial UV Light Emitting Diodes (LED) such as those manufactured by Phoseon® may be utilised for curing the polymers compound, if the polymer compound is e.g. silicone rubber. In a typical embodiment, the UV emitting semiconductor light source(s) comprises a UV LED. However, it is envisaged that alternatively or in combination, other semiconductor light sources may be used, such as UV-emitting Organic Light Emitting Diodes (OLED) or diffused UV-emitting semiconductor lasers.

Preferably, the UV light is in the range 290 nm to 400 nm. In particular, 365 nm may be a preferable wavelength for irradiating the liquid silicone rubber through the mould. In one embodiment, the UV light has a 395 nm wavelength. 395 nm may be beneficial in that it is simple and cheap to produce UV light sources emitting 395 nm wavelengths light.

Step S2 of irradiating may comprise irradiating the mould 2 from several directions simultaneously. Simultaneous irradiation may be achieved by arranging several UV light sources around the mould.

Alternatively, the mould may be rotated around an axis of the mould so as to receive irradiation to its entire peripheral surface from one or several fixed UV light sources. Thereby, the UV light sources need not be placed around the mould.

Alternatively, the UV light source(s) may be rotated around the mould so as to provide irradiation from several directions on the mould.

The step S2 of irradiating may comprise irradiating the liquid silicone rubber for a time in the range 10-60 seconds. Preferably, the step S2 of irradiating the liquid silicone rubber may comprise irradiating the liquid silicone rubber for a time in the range 15-25 seconds. 15-25 seconds may be sufficient for curing the polymer compound.

Beneficially, the above-described process and assembly may provide an efficient, reliable and cost-efficient manufacturing method of producing a cured polymer structure.

Hereafter, examples of mould engineering materials, their use, and advantages thereof will be described in more detail.

EXAMPLE 1

Polyvinyl Chloride

Due to the very good results in initial tests, PVC has been shown to be a suitable choice when selecting mould material for a vacuum formed mould. PVC is very easy to form using vacuum. PVC also shows excellent de-moulding properties with negligible adhesion to the cured LSR material in the mould, and no inhibiting tendencies.

PVC containing a minimum of anti-ageing agents seems to be a good choice for use in disposable blister pack-type moulds with regard to price and process ability. Two-part moulds having two halves forming a mould space when placed together were evaluated in laboratory tests. Three PVC sheet thicknesses were evaluated using a vacuum moulding matrix. The PVC sheets had the following thickness: 0.3 mm, 0.5 mm, and 0.7 mm. For these thicknesses, the mould halves produced were excellent replicas of the shape of a vacuum moulding matrix used for forming the moulds. Such moulds may for instance be used for moulding cable terminations.

Another example of a mould is a conically shaped mould part for a stress cone. Such moulds may be formed by means of well-known techniques in the art, such as for instance vacuum forming. For vacuum forming the mould, a heated PVC foil is applied onto a conically shaped matrix mould, wherein an under pressure is applied to the matrix mould arrangement, thereby pressing the PVC foil against the conical matrix mould. The matrix mould may be manufactured from a metal such as for instance aluminium, which cools the PVC foil.

The conically shaped matrix mould produces single part conically shaped moulds. Such moulds may be advantageous in high voltage applications, because the moulded and cured polymer structure, such as a stress cone will have no longitudinal mould parting lines which arises when using two mould halves for moulding a stress cone. As a result, no post-moulding rotational lathing of the stress cone is necessary for removing longitudinal mould parting lines. Such longitudinal mould parting lines are typically not desirable as corona discharges may be generated at a longitudinal mould parting line.

Figure 3:
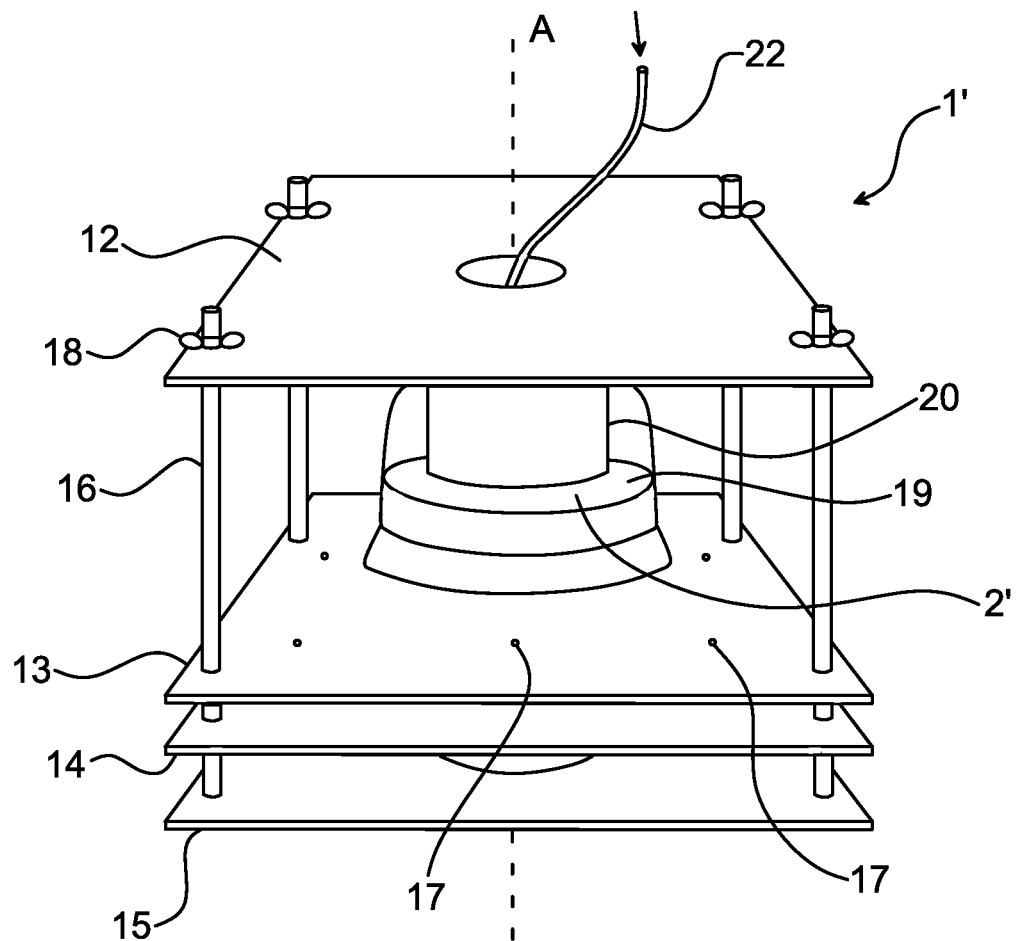
FIG. 3 shows a perspective view of another example of an assembly for producing a cured polymer structure.

FIG. 3 shows an example of an assembly 1' for producing e.g. a stress cone. The UV light sources have been omitted for clarity. The UV light sources are typically arranged in the near vicinity of the mould so as to provide a high intensity and less diffused irradiation of the mould and the polymer compound in the mould.

The exemplified assembly 1' may for instance be used for producing a stress cone. It is however to be noted that the present invention allows for a multitude of various mould shapes and applications thereof, each depending on the desired end product, i.e. the polymer structure to be moulded therein.

Assembly 1 comprises a top plate 12, a guide plate 13, a base plate 14, and a bottom plate 15. Each plate 12, 13, 14, and 15 has an opening extending through the respective plate 12, 13, 14, and 15. In the assembly 1', the openings are coaxially arranged. The openings are for fitting the mould 2' in the assembly 1'.

The guide plate 13 and the base plate 14 may be assembled with each other by means of fastening means 17, so as to fix a planar bottom portion of the mould 2' therebetween. The assembly 1' is assembled by means of four threaded assembly bars 16 fastened by wing nuts 18 to the top plate 12. Of course, also other forms of fastening means are possible as would be apparent to the skilled person.

The mould 2', having a conical shape in the present example, is fitted in the assembly by means of the openings and fixed between the top plate 12 and the bottom plate 15. A field grading part 19 comprising carbon black filled LSR is provided in the mould 2'. The field gradient part 19 forms part of the finished stress cone product.

A core insert means 20 is fitted in the mould 2' during the moulding and curing process of the liquid silicone rubber. The core insert means extends coaxially along axis A through the mould 2'. Thereby, a central channel extending through the liquid silicone rubber (not shown) which is to be produced in the mould 2' is created. Hence, the stress cone may accommodate e.g. a high voltage cable.

An injecting means, exemplified by a tubular means 22, is inserted in an opening in the top portion of the mould 2' for providing the liquid silicone rubber therethrough into the mould 2'. The field gradient part 19, which is annular shaped, and which is fitted between the wall of the mould 2' and around the core insert means 20 together block the bottom opening so that the injected LSR stays in the mould 2'.

After filling the mould 2' with LSR, the mould 2' may be irradiated with UV light emitted from at least one UV light source for curing the LSR.

The core insert means 20 may be transparent or non-transparent. A transparent core insert means may be manufactured from e.g. PMMA. A non-transparent core insert means may be manufactured from aluminium.

Figure 4:
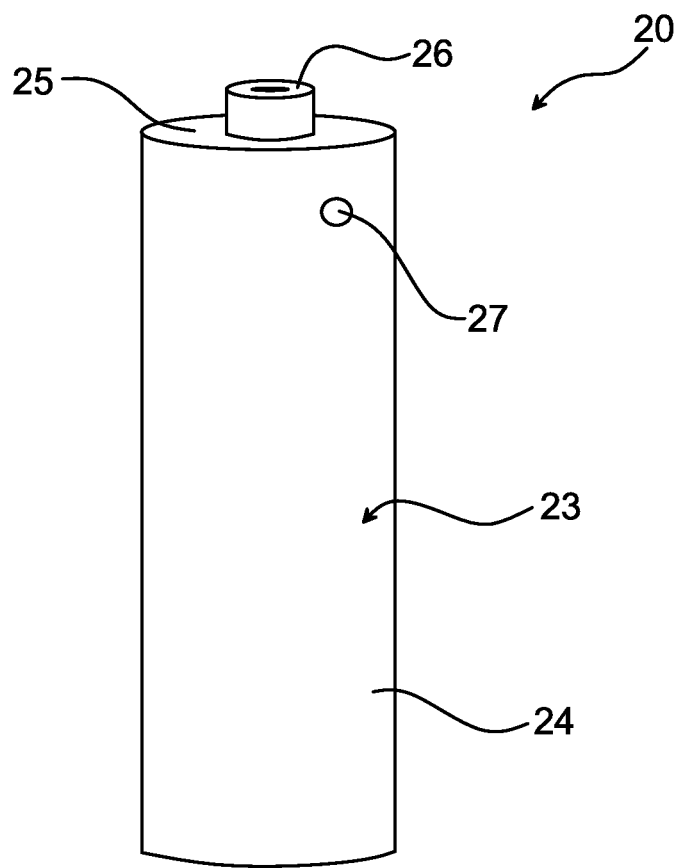
FIG. 4 shows a core insert means for the assembly in FIG. 3.
Figure 5:
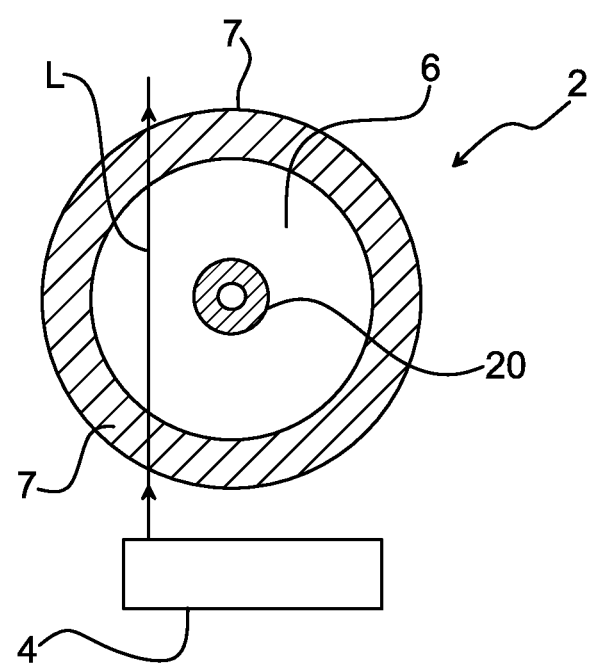
FIG. 5 shows a cross-sectional view of an example of a mould.

FIG. 4 shows an example of a core insert means 20. Core insert means 20 has a body 23 presenting a peripheral surface 24. The body of the core insert means 20 in the present example is cylindrical, but may of course have any other shape for forming a channel or a cavity in a polymer structure. The core insert means 20 has a top surface 25. The top surface 25 has an inlet 26. The tubular means 22 is connectable to the inlet 26. The body 23 has a cavity connecting the inlet 16 with at least one opening 27 in the peripheral surface 24. Thereby LSR injected in the inlet 16 may be injected into the mould 20 when the mould 20 is fitted around the core insert means 20. Preferably the injection of the LSR should be bottom-cast in order to avoid entrapped air in the mould 20.

EXAMPLE 2

Castable Polyurethane (PUR)

One advantage provided by PUR mould manufacturing techniques is the possibility to make multiple copies of moulds and in this way save time, material and costs compared to directly machining mould parts from blanks such as rods, plates etc. An alternative PUR material which does not contain mercury, and which PUR material also passes requirements regarding UV-transparency, is ALCHEMIX VC 3350.

Elastomers

In one embodiment, the liquid silicone rubber itself may be used as mould material. Test have shown that curing through a wall thickness of approximately 30-40 mm of liquid silicone rubber is possible with quite little increase in cure time compared to thinner walled plastic moulds. In this embodiment, a suitable, highly UV-transparent release agent that does not affect the surface properties of the product which is to be cured, i.e. the polymer compound should be used. Such a release agent would most likely be needed to be applied for each moulding cycle.

It is also envisaged that a highly elastic and UV transparent polar rubber material be used as mould material. A highly elastic and UV transparent polar rubber material may open up possibilities for intricate product design without longitudinal mould parting lines and hence no electrical breakdown at critical parts of the moulded and cured polymer structure, if the mould is used for producing polymer structures for high voltage applications.

Vacuum Forming

Forming temperatures are usually in the range of 85-105° C. This results in only a small shrinkage of the thermoplastic sheet for forming the mould, when cooling from the moulding temperature to ambient temperature. The shrinkage in the case of PVC is about 0.5%. When a particular plastic material grade is selected, this mould shrinkage can be calculated and determined with good accuracy.

Blow Moulding

For blow moulding, negative moulds are preferably used. This means that the mould outer dimensions like diameters and length dimensions will in some degree be dependent of variations in material thicknesses of the thermoplastic sheet of which the mould is produced. However, in most cases these variations will be within the tolerances for the products which are to be moulded in the mould. Especially for thin walled, small cylindrical shaped high volume products such as cable terminations, this production process is suitable and cost effective.

Tests have shown good curing performance of liquid silicone rubber for PP moulds, implicating good UV-light transparency for PP. A PE metallocene material and a PP material with high contact transparency were also tested. For the PP material, it was shown that if the liquid silicone rubber is in direct contact with a mould part made of this PP, it shows excellent UV transparency.

The tests for PE and PP materials show that the PE and PP materials allowed UV-light of 365 nm wave length to pass and to cure underlying UV-LSR without any apparent reduction when tested with wall thicknesses used in blow moulded moulds. PE and PP materials may hence be suitable choices for blow moulding technique for UV curable liquid silicone rubber products to be manufactured in great numbers.

FIG. 4 shows a cross-sectional view of the mould 2 with core insert means 20 inserted in the mould 2. A UV light source 4 is shown irradiating the mould 2 by means of an exemplifying light beam L. The light beam L penetrates a near end portion of the wall 7 with respect to the UV light source 4. The light beam 7 also penetrates a far end portion of the wall 7' with respect to the light source 4. The far end portion is opposite the near end portion. Hence, the light beam L enters the near end of the wall 7 and exits on the far end of the wall 7. To this end the light beam L propagates through the mould space 6 and thus through the mould 2. The described structure of the mould 2, provides for a mould 2 which may be irradiated from any direction so as to cure a polymer compound injected into the mould 2 and hence into the mould space 6. This may be beneficial for curing large objects, such as high voltage insulators, so as to irradiate, with high UV light intensity, all portions of the large object in contact with the peripheral surface of the wall 7 to thereby obtain curing of all portions of the large object.

The cured polymer structures produced by means of the present invention may advantageously act as insulators in high voltage applications. For instance, the cured polymer structures may be used in insulating assemblies insulating power transmission lines from pylons, or as bushings. Bushings typically insulate a high voltage conductor, extending through the bushing, from surrounding objects. Further, a cured polymer structure according to the invention may form a stress cone for cable sealing ends e.g. for high-voltage conductor connections.

It will be obvious that the present invention may be varied in a plurality of ways. Such variations are not to be regarded as departure from the scope of the present invention as defined by the appended claims. The skilled person in the art would understand in what other type of applications the present method would be useful.

The invention claimed is:

1. A method for producing a cured polymer structure from a polymer compound, which polymer compound is UV curable and partly UV transparent, wherein the method comprises:

injecting (S1) the polymer compound into a mould (2; 2'), which mould (2; 2') has at least one wall (7) defining a mould space (6) for receiving the polymer compound in the mould space (6), wherein the at least one wall (7) is UV transparent and comprises a thermoplastic polymer and wherein the at least one wall (7) is so thin that the at least one wall (7) is flexible, and wherein the mould (2, 2') is a blister pack, and irradiating (S2) the polymer compound, through the at least one wall (7), by means of UV light provided by at least one UV semiconductor light source, wherein the irradiating comprises irradiating the at least one wall (7) such that UV light passes through the polymer compound, thereby curing the polymer compound to form the cured polymer structure.

2. The method as claimed in claim 1, wherein the mould (2; 2') comprises Polyvinyl chloride.

3. The method as claimed in claim 1, wherein the mould (2) comprises Polyethylene terephthalate.

4. The method as claimed in claim 1, wherein the at least one wall (7) has a thickness less than 1 mm.

5. The method as claimed in claim 1, wherein the irradiating (S2) comprises irradiating the polymer compound from several directions simultaneously.

6. The method as claimed in claim 1, wherein the irradiating (S2) comprises irradiating with UV light having wavelengths in the range 290-400 nm.

7. The method as claimed in claim 1, wherein the irradiating (S2) comprises irradiating with UV light having a wavelength of 365 nm.

8. The method as claimed in claim 1, wherein the polymer compound comprises liquid silicone, rubber.

9. The method as claimed in claim 1, comprising mixing (S0) a UV-activated catalyst with at least one portion of the polymer compound.

10. The method as claimed in claim 1, wherein the irradiating (S2) comprises irradiating the polymer compound for a time in the range 10-60 seconds.

11. The method as claimed in claim 1, wherein the irradiating (S2) comprises circumferential irradiation of an external peripheral surface of the at least one wall (7).

12. The method as claimed in claim 1, wherein the polymer structure is a high voltage insulator.

* * * * *